INVENTORS
R. L. Palmer, J. A. Haddad
J. E. Fernekees, E. B. Chapman
BY John F. Hanifin
ATTORNEY INVENTORS
R.L.Palmer J.A.Haddad
J.E.Fernekees, E.B.Chapman
BY John F. Hanifin
ATTORNEY Sept. 30, 1958 R. L. PALMER ET AL 2,854,654

STORAGE DEVICE

Filed July 26, 1952 9 Sheets-Sheet 3

INVENTORS
R.L.Palmer, J.A.Haddad
J.E.Fernekees, E.B.Chapman
BY John F. Hanifin
ATTORNEY INVENTORS
R.L.Palmer, J.A.Haddad
J.E.Femekees, E.B.Chapman
BY John F. Hanifin
ATTORNEY

STORAGE DEVICE

Filed July 26, 1952 9 Sheets-Sheet 5

INVENTORS
R.L. Palmer, J.A. Haddad
J.E. Fernekees, E.B. Chapman
BY
John F. Hanifin
ATTORNEY INVENTORS
R.L. Palmer, J.A. Haddad
J.E. Fernekees, E.B. Chapman
BY John F. Hanifin
ATTORNEY Sept. 30, 1958 R. L. PALMER ET AL 2,854,654

STORAGE DEVICE

Filed July 26, 1952 9 Sheets-Sheet 7

INVENTORS
R. L. Palmer, J. A. Haddad
J. E. Fernekees, E. B. Chapman
BY John T. Hanifin
ATTORNEY INVENTORS
R.L.Palmer, J.A.Haddad
J.E.Fernekees, E.B.Chapman
BY John F. Hanifin
ATTORNEY STORAGE DEVICE
Filed July 26, 1952 9 Sheets-Sheet 9
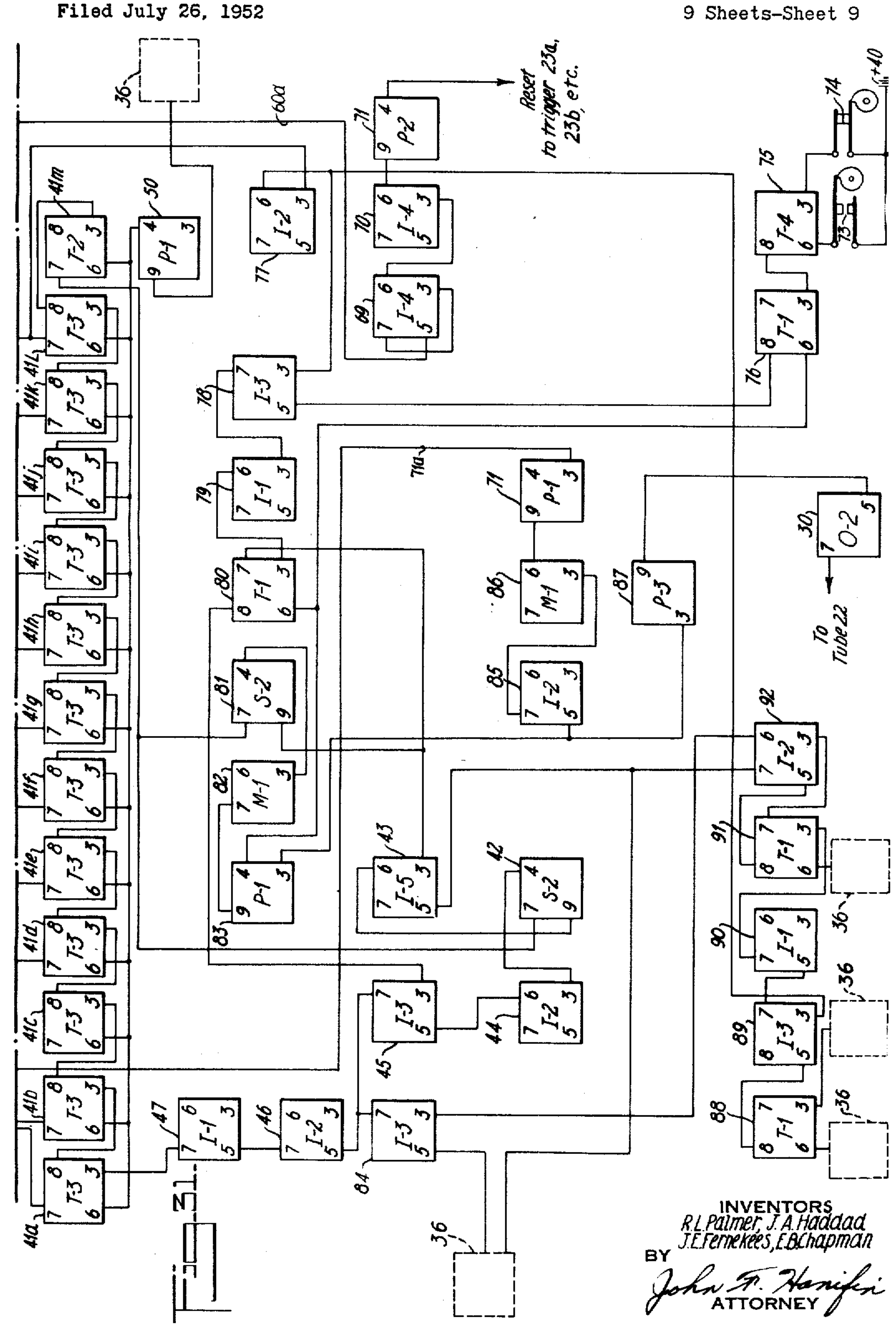
INVENTORS
R. L. Palmer, J. A. Haddad
J. E. Fernekees, E. B. Chapman
BY John F. Hanifin
ATTORNEY

United States Patent Office 2,854,654

Patented Sept. 30, 1958

2,854,654

STORAGE DEVICE

Ralph L. Palmer, Poughkeepsie, Jerrier A. Haddad and James E. Fernekees, Wappingers Falls, and Edward B. Chapman, Poughkeepsie, N. Y., assignors to International Business Machines Corporation, New York, N. Y., a corporation of New York Application July 26, 1952, Serial No. 301,012

16 Claims. (Cl. 340—174)

This invention relates to a calculating machine and more particularly to electronically operated factor storage means for such a machine, and it has for one of its objects the provision of an improved device of this character.

Present day calculating machines, employing electronic devices and circuits, perform the operations of addition, subtraction, multiplication, and division algebraically at greater speeds than mechanical or electro-mechanical devices can be operated. Important components of such calculators are storage units in which information may be entered either before, during, or after calculation and then be available for read out whenever desired. Various systems and methods of storage have been devised, but many of them are either costly or complicated. A cheap, dependable, and efficient method of storage is the use of electrical pulses to charge condensers, the condenser being the storage medium. A device employing such a method is disclosed in the patent to Wagner and Lawhead, No. 2,480,795, issued August 30, 1949.

As described in said patent, the charge on the condenser is used to operate an Eccles-Jordan type trigger circuit, which circuit, when triggered, emits an electrical pulse to recharge the condenser. The device of the present invention utilizes such a phenomenon, in combination with high speed switching means so that several condensers may be used to store time coded pulses, the charged-uncharged pattern of the condensers representing characters according to a code. It is therefore an object of this invention to provide a high speed storage system employing condensers charged in patterns to represent such characters.

A further object is to control the storage of coded information by means of electrical discharge devices.

Another object is to provide a system for storing time coded electrical pulses.

A further object is to provide such a plurality of information storing condensers, in combination with fast operating read-in, regeneration and read-out means.

Another object is to provide novel means in combination whereby a card is read at mechanical operating speed and electronic means is provided to regenerate the stored value a large number of times during the time provided for one reading of the card.

Other objects of the invention will be pointed out in the following description and claims and illustrated in the accompanying drawings, which disclose, by way of example, the principle of the invention and the best mode, which has been contemplated, of applying that principle.

In the novel apparatus of the invention, a switching system is provided which automatically operates, in a time coded sequence, to connect each of the condensers respectively, in a particular columnar order, to a related trigger circuit. Each condenser is assigned a weighted or coded value, so that when the condenser is charged, the storage of the particular coded value is effected. The trigger circuit is acted upon, as each condenser is connected to it, either to initiate, regenerate, or read out a charge. Obviously, any number of columnar orders, and various codes, may be used but, for the purpose of simplicity of explanation, only components, sufficient for providing the storage of two columnar orders and in a simple decimal code, are shown and described.

The original source of data, as illustrated, is a punched card but any other type of a time coded impulse emitter may be employed.

The storage system, hereafter described, may be adapted for use in any type calculator which requires storing of information, but special reference is made in this specification to the calculator described in the application of R. L. Palmer et al., Serial No. 38,078, filed July 9, 1948, now U. S. Patent 2,658,681.

For a better and more complete understanding of the invention, reference should now be had to the following specification and to the accompanying drawings of which Figs. 1, 2, 3 and 4 illustrate electronic trigger circuits;

Figs. 30 and 31 are block diagrams which, when considered together, illustrate the control and interlock circuits.

Figure 27:
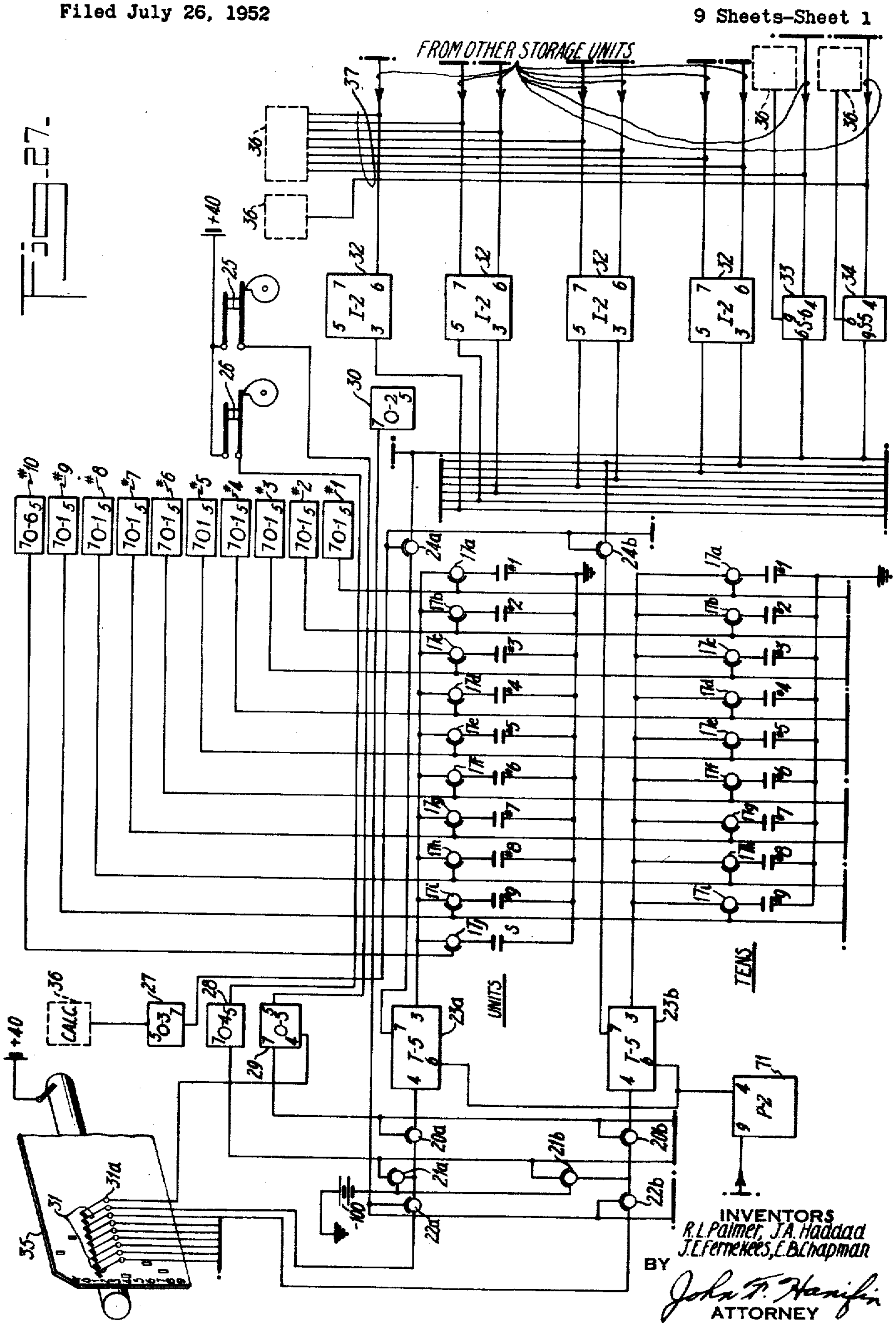
Fig. 27 is a diagrammatic view of two columnar orders of read-in and read-out circuits.

Wherever shown, unless otherwise indicated in the drawings, the values for the various resistors, inductances and condensers are in thousands of ohms, microhenries, and micro-microfarads, respectively. For example, a resistor labeled 200 indicates a 200K (200 thousand) ohm resistor; a condenser labeled 100 indicates a 100 micro-microfarad condenser. The terms "positive" and "negative" potentials, used in the discussion of the circuits, refer to relative values rather than values with respect to ground.

Referring to the drawings and more particularly to Figs. 1 through 4 and Fig. 26, these circuits illustrate details of electronic triggers, designated T1 through T5, commonly known in the art as the Eccles-Jordan trigger. These comprise two cross-coupled triodes (which may be included in one envelope as in a 6J6 type tube) in which the plate P1 (Fig. 1) is cross-coupled by a 200K resistor in series with a 1K resistor to the grid G2 and the plate P2 is likewise cross-coupled to the grid G1 by a 200K ohm resistor in series with a 1K ohm resistor. Each of these 200K resistors is shunted by a 100 micro-microfarad condenser. The grid G1 is connected via the 1K resistor in series with a 200K resistor to a power supply of −100 volts and through the same 1K resistor in series with a 40 micro-microfarad condenser to an input terminal 6. The grid G2 is connected by identical circuitry to the −100 volt power supply and to the input terminal 6. The plates P1 and P2 are similarly connected to a +150 volt power supply via pairs of 7.5K and 12K resistors in series, as shown. The cathodes K1 and K2 are grounded. The left triode may be rendered conductive by a positive pulse of suitable amplitude applied via terminal 6, the condenser G1C and the resistor G1R to the grid G1. As the left triode is rendered conductive, the voltage at P1 is lowered which voltage, through the cross-coupling previously described, maintains the grid G2 relatively negative and blocks conduction of the right triode; thus P1 is negative while P2 is positive. This is one state of stability of the trigger. In a similar manner, the right triode can be rendered conductive by the application of a positive pulse of suitable amplitude to the grid G2 via terminal 3, the condenser G2C and the resistor G2R, whereupon the reduction in voltage on the plate P2 is applied by the cross-coupling connection to the grid G1 to block the left triode, P1 now becoming positive.

Figure 1:
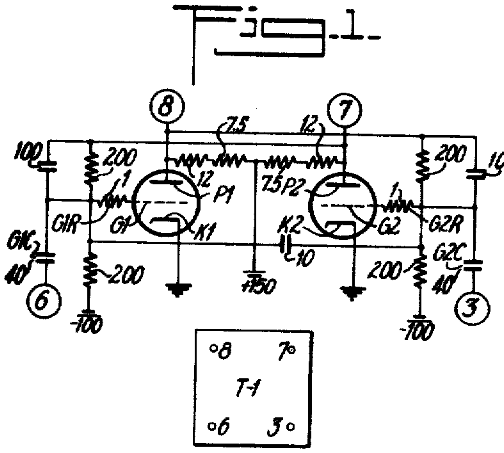
Figure 4:
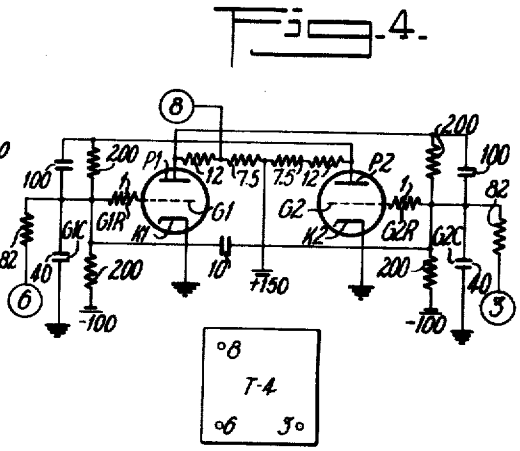
Figure 2:
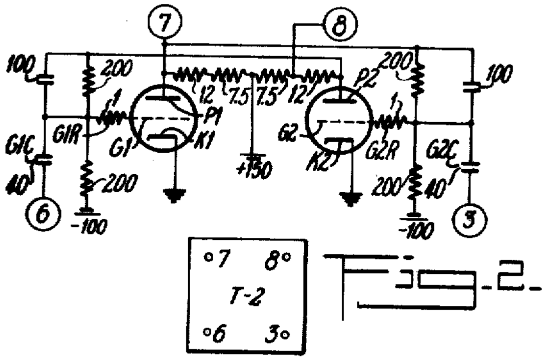

If the left triode is conducting and a negative voltage is applied through the terminal 6 to the grid G1, either through a condenser G1C and a resistor G1R (as in Fig. 1) or through an 82K resistor and a G1R resistor (as in Fig. 4), the left triode is cut off thereby causing the right triode to conduct. If the right triode is conducting and a positive voltage of suitable amplitude is applied to the terminal 6, it causes the left triode to conduct and thereby block the right triode. Voltages applied to the grid G2 through terminal 3 cause operation of the trigger in a similar manner. In Figs. 1 and 4, a 10 micro-microfarad condenser is connected between the grid input circuits to obtain a more stabilized operation, the condenser tending to prevent circuit operation by transient pulses.

Figure 5:
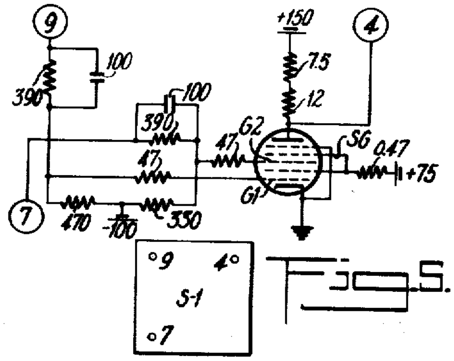
Figs. 5, 6 and 7 show electronic switching circuits.
Figure 3:
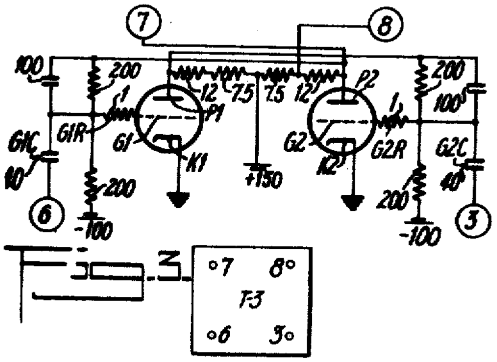
Figure 6:
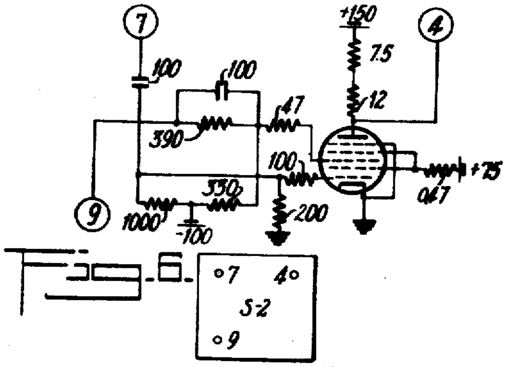
Figure 7:
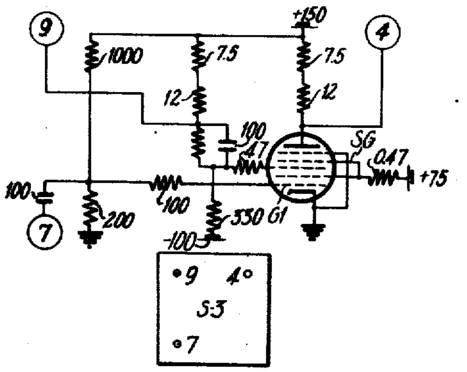
Figure 14:
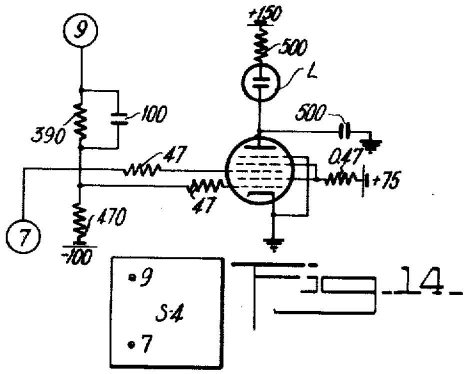
Fig. 14 shows another type of electronic switching circuit.
Figure 17:
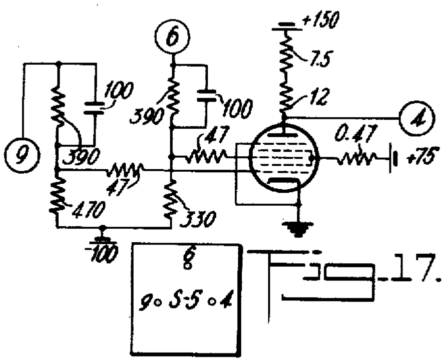
Figs. 17 and 18 show additional switch circuits.
Figure 18:
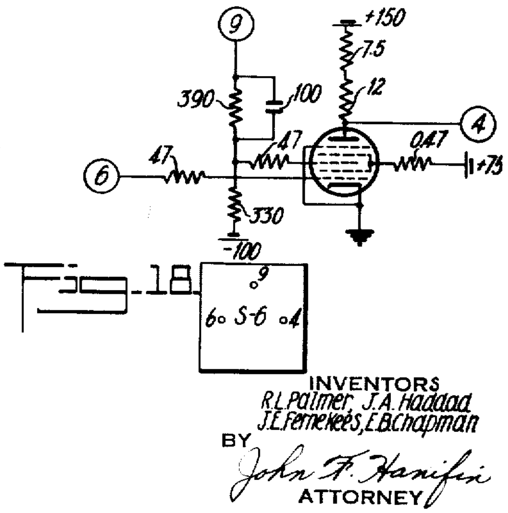
Figure 19:
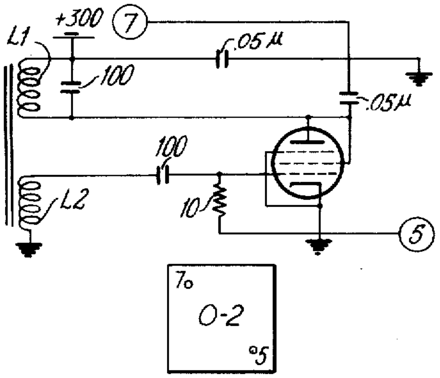
Figs. 19, 20, 21, 22, 23 and 24 show various oscillator circuits.
Figure 22:
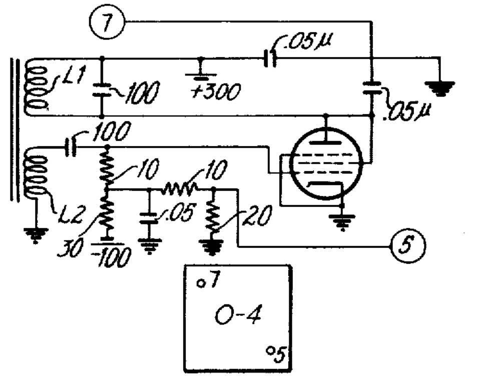
Figure 20:
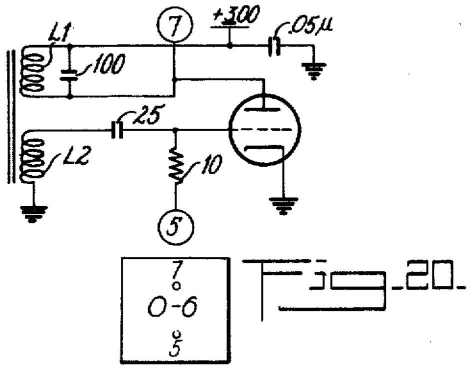
Figure 23:
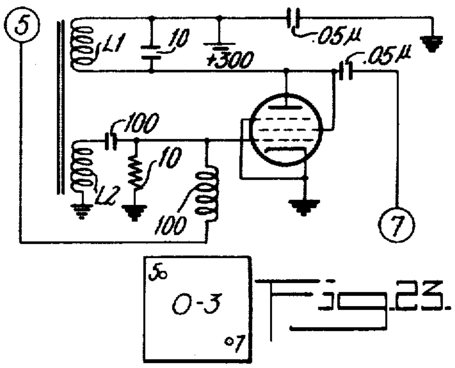

Figs. 5, 6 and 7 illustrate electronic switching circuits in detail with blocks S–1, S–2 and S–3 representing these respective circuits, while Figs. 14, 17 and 18 also illustrate the details of various electronic switching circuits, the respective blocks being indicated by S–4, S–5 and S–6. Referring to Fig. 5, the block S–1 specifically includes a penta-grid tube with its cathode grounded and its suppressor grid directly connected to the cathode. The grid G1 is shown connected by way of a 47K resistor in series with a 470K resistor to a voltage supply of −100 volts, and is also connected by the same 47K resistor in series with a 390K resistor to the input terminal 9, the 390K resistor being shunted by a 100 micro-microfarad condenser. Grid G2 is connected through a 47K resistor in series with a 330K resistor to the power supply of −100 volts and is also connected through the same 47K resistor in series with a 390K resistor to the input terminal 7, the 390K resistor being shunted by a 100 micro-microfarad condenser. The screen grid SG is connected by a 0.47K resistor to a power supply of 75 volts, while the plate is connected directly to an output terminal 4 and also to a power supply of +150 volts through series resistors of 12K and 7.5K ohms. Each of the switch circuits S1 to S6 comprises a tube of the 6BE6 type but various values of condensers and resistors may be employed differing from those shown in Fig. 5. The switch circuit S–4 (Fig. 14) has a glow tube L, connected between the plate and its plate resistor, which produces a glow when the switch tube is conducting.

The switches S–1 and S–4 require simultaneous positive inputs at input terminals 7 and 9 to cause conduction in the respective tubes so that the output is negative only when both inputs are positive. When only one or both of the inputs are negative, the output is positive. The switches S–5 and S–6 operate in a similar manner except that the input terminals are numbered 6 and 9.

The switch S–2 (Fig. 6) is conditioned by a positive input to pin 9. A positive signal applied to pin 7 is differentiated by the 100 micro-microfarad input condenser and the associated resistor network so that only a sharp positive pulse reaches the grid. The tube conducts a short time only, that is, for a time interval approximating the length of the sharp pulse resulting from the differentiated signal. Therefore, if the input to pin 9 is positive and a positive signal (pulse or steady state voltage) is also applied to pin 7, a negative pulse is available at output pin 4.

The switch S–3 (Fig. 7) is normally conducting thereby providing a normal negative output. If a negative input signal is fed to pin 9, however, the tube is cut off and the output at pin 4 goes positive for the duration of the signal. Likewise, if a negative signal is applied to input pin 7, it is differentiated and the tube is cut off for a short time, and the resulting output at pin 4 is a short positive pulse.

Figure 8:
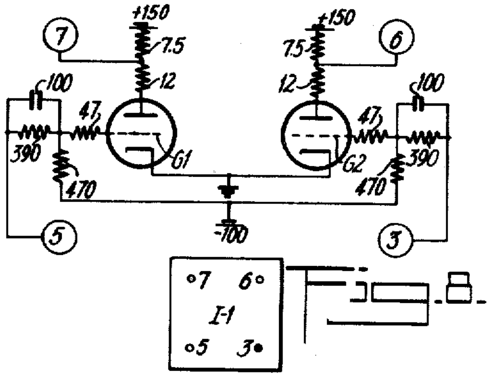
Figs. 8 and 9 show inverter circuits.

Inverter circuits, designated I–1 through I–5 respectively, are shown in Figs. 8, 11, 9, 12 and 25A. A tube of the double triode 6J6 type may be used. Referring to Fig. 8, the grid G1 is connected by a 47K resistor and a 470K resistor to a power supply of −100 volts and the grid G2 is similarly connected to the same supply through resistors having the same values. The grid G1 is also connected to terminal 5 through the same 47K resistor in series with 390K resistor, the latter resistor being shunted by a 100 micro-microfarad condenser. The grid G2 is connected to terminal 3 by an identical circuit. Each plate is connected to a +150 volt supply through separate pairs of 12K and 7.5K series resistors.

Figure 11:
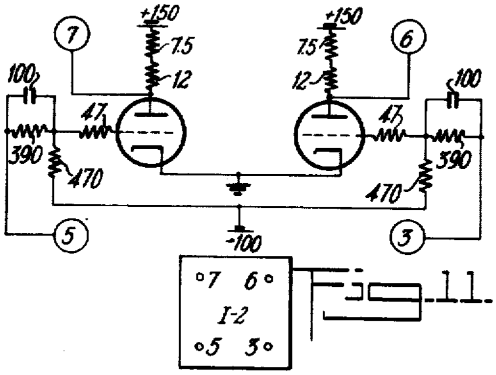
Figs. 11 and 12 illustrate additional types of inverter circuits.
Figure 12:
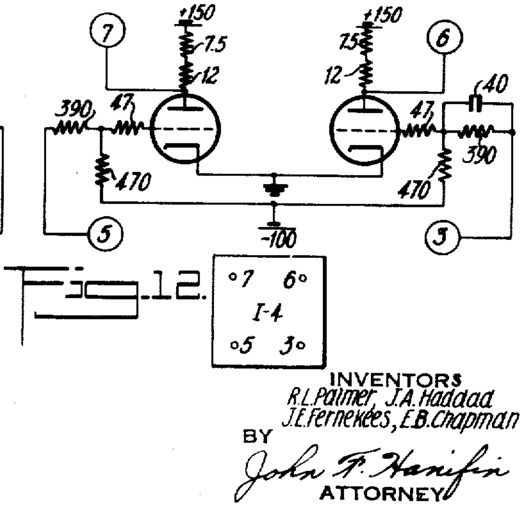

Referring to Figs. 8, 11 and 12, respectively, the inverters I–1, I–2, and I–4 each is supplied with a positive input to pin 5 or pin 3 to, in turn, produce a negative signal at the corresponding output pin 7 or 6. Conversely, negative inputs produce positive outputs.

Figure 9:
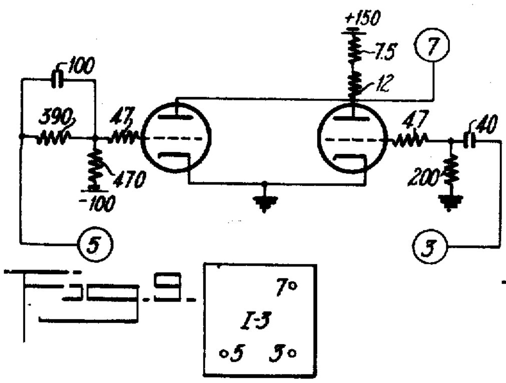

Referring to Fig. 9, the inverter I–3 operates as follows:

Normally, with no input to either pin 3 or 5, the left tube is biased negatively and is held nonconducting while the right tube is at zero bias and is conducting so that the output at pin 7 is negative. If a negative signal (pulse or steady state) is applied to pin 3, it is differentiated and the resulting negative spike cuts off the right tube so that the resulting output is a positive pulse. However, if a positive signal is applied to pin 5, the left tube conducts so that the output at pin 7 is negative. Signals to pin 3 then have no effect on the output. Summarizing, the output at pin 7 is negative, except that there may be positive pulse outputs when there is no input to pin 5 and negative signals are applied to pin 3.

The inverter I–5 (Fig. 25A) normally has a positive output since both tubes are biased below cut off. A positive input to pin 5 causes the left tube to conduct while a positive input to pin 3 causes the right tube to conduct. When either tube is conducting, the output at pin 6 is negative.

Figure 10:
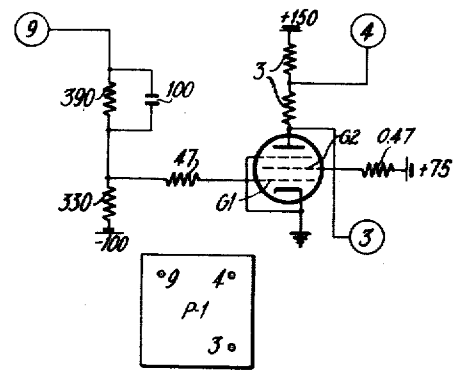
Fig. 10 shows a power circuit.
Figure 16:
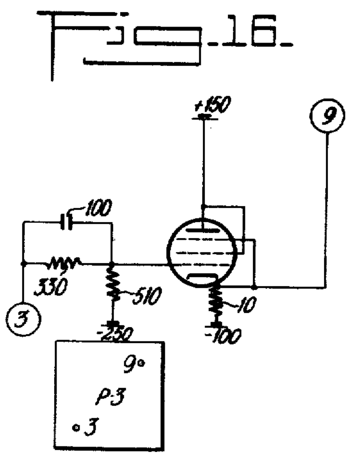
Figs. 15 and 16 show additional power circuits.
Figure 15:
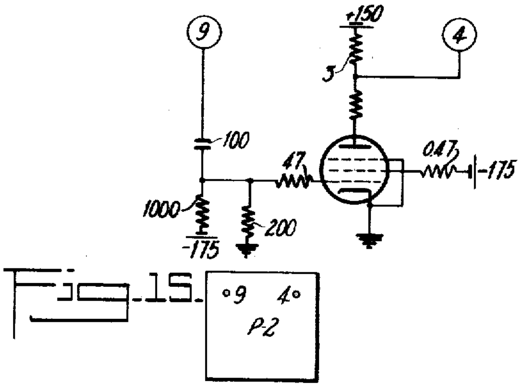

Refer now to Figs. 10, 15, and 16 which illustrate power tube circuits, designated P–1, P–2 and P–3, respectively. The circuit shown in Fig. 10 includes a pentode, which may be of the 6AQ5 type with a grounded cathode and a suppressor grid directly connected to the cathode. Grid G1 is connected by a 47K resistor in series with a 330K resistor to a power supply of −100 volts, and is also connected through the same 47K resistor and a 390K resistor, shunted by a 100 micro-microfarad condenser, to the input terminal 9. The grid G2 is connected through a 0.47K resistor to a power supply of +75 volts. The plate is connected to a +150 volt power supply through a 3K, 10 watt resistor which is tapped for the lead out terminal 4. While the same type tube 6AQ5 may be employed for each of the power tube circuits, various values of the condensers and resistors may be used, or the connections of the elements may be varied, as is well-known by those skilled in the art. For example, the circuit illustrated in Fig. 16 comprises a well-known cathode follower.

Figure 13:
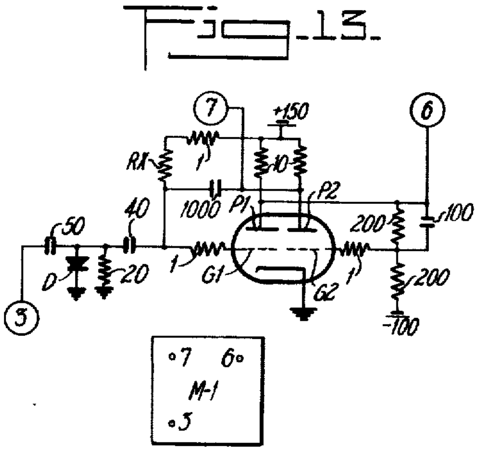
Fig. 13 shows a multivibrator circuit.

The circuit M–1 shown in Fig. 13 comprises what is known in the art as a one shot multivibrator making use of a double triode tube such as the 6J6. The grid G1 is connected to the input terminal 3 via a 1K resistor, a 40 micro-microfarad condenser, a rectifier circuit (consisting of a crystal rectifier D and a 20K resistor in parallel therewith, both connected to ground so that only negative pulses pass through to the grid), and a 50 micro-microfarad condenser. The grid G1 is connected through the same 1K resistor in series with a resistance RX and a 1K resistor to a power supply of +150 volts and also through the same 1K resistor, in series with a 1000 micro-microfarad condenser, to the plate P2. The grid G2 is connected through a 1K resistor, in series with a 200K resistor, to a power supply of −100 volts and is also connected through the same 1K resistor, in series with a 200K resistor, shunted by a 100 micro-microfarad condenser, to the plate P1. The plates P1 and P2 are both connected to a power supply of +150 volts through 10K resistors while the cathode is grounded. Outputs 6 and 7 are connected to plates P1 and P2, respectively. Normally, the left triode is conducting so that a negative pulse fed in at terminal 3 is necessary to cause the circuit to flip. A positive pulse applied at input terminal 3 has no effect since it is bypassed by the rectifier circuit. If the resistance RX has a value of 1.2K ohms, the period of the multivibrator is 400 microseconds while an increase in the value of RX to 1.8K ohms increases the period to 600 microseconds.

Figure 21:
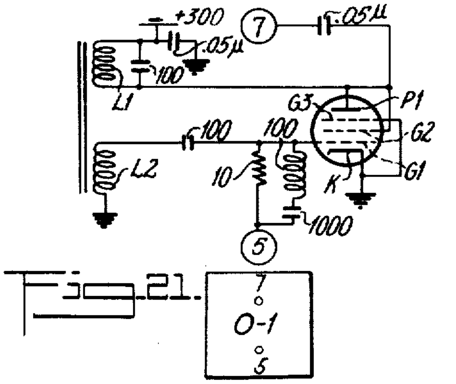
Figure 24:
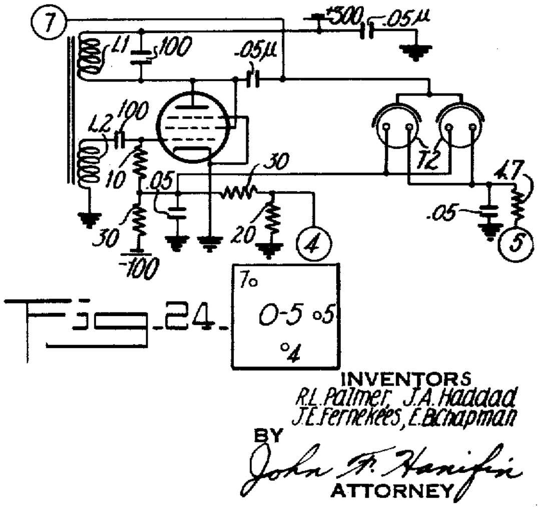

In Figs. 19 through 24, the oscillator circuits 0–1 through 0–6 are shown. Each oscillator is of the tuned plate, reverse feed back type. Referring to Fig. 21, the oscillator 0–1 includes a pentode, which may include a 6AQ5 beam power tube, whose suppressor grid G3 is connected to the cathode K and to ground. The plate P1 and the screen grid G2 are connected together and to a +300 volt power supply through the tuned circuit consisting of a coil L1 of a mutual inductance unit, shunted by a 100 micro-microfarad condenser. A connection from the plate to ground is made through the same tuned circuit, in series with a .05 microfarad condenser. The grid G1 is connected to ground through a 100 micro-microfarad condenser in series with a coil L2 of the mutual inductance unit. The grid G1 is also connected to pin 5 through a 10K resistor shunted by a 100 micro-henry inductance in series with a 1000 micro-microfarad condenser. Operation of the oscillator depends on the value of the grid bias applied at the pin 5, oscillations taking place only when the grid G1 is biased at a potential value at which the tube can conduct. The output pin 7 is connected to the plate P1 through a .05 micro-farad condenser. Various modifications are made in the circuit connections and element values of the other oscillator circuits. As shown in Fig. 24, the "self-latching" oscillator 0–5 has a resistor and condenser network leading to the ground side of the 10K grid resistor. The grid is normally biased beyond the operating potential of the tube, and it is necessary to feed a positive pulse to pin 4, sufficient to overcome the bias, to start oscillations. Once oscillations are started, however, the neon switch tubes T2 (described later) are energized by the oscillator output, and if a positive potential is present at pin 5, the neon tubes conduct and the circuit is completed to overcome the bias voltage. Oscillations continue, even after termination of the signal at pin 4, until the voltage applied to pin 5 is removed.

Figures 25, 25A:
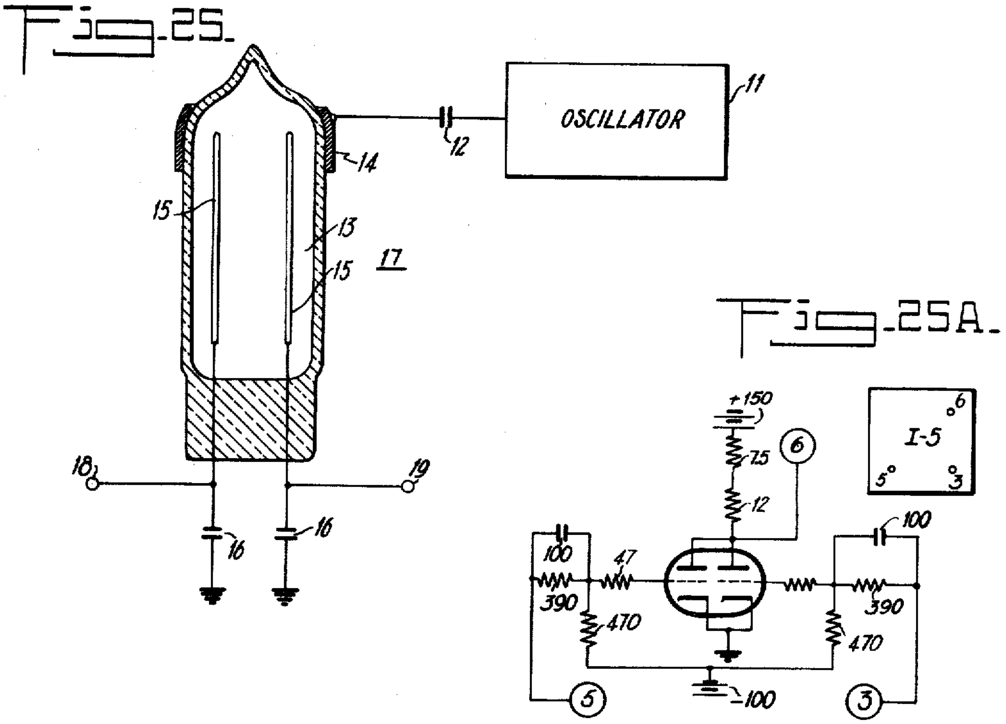
Fig. 25 shows a high frequency actuated gaseous discharge switch tube.
Fig. 25A shows an additional inverter circuit.
Figure 26:
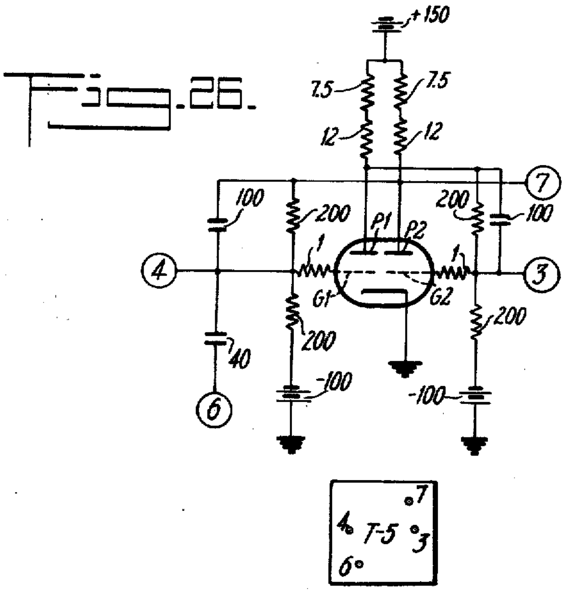
Fig. 26 shows another trigger circuit.

An important component of the storage system is the provision of a switching means which can be alternately opened and closed at microsecond speeds. In Fig. 25 a high frequency oscillator 11 is coupled through a condenser 12 to a conductive coating 14 on the gaseous discharge tube 13. The high frequency circuit is then completed through the gas in the tube to the electrodes 15 and thence to ground through condensers 16. (Note: In the diagrammatic representations of the tube hereafter made, the condensers 16 will not be shown.) There is an open circuit, between points 18 and 19, for voltages less in value than the ordinary Direct Current Firing potential of the tube. However, when the high frequency signal is applied, the gas becomes ionized and the voltage difference established between points 18 and 19 (see later) causes current to flow through the tube in a direction commensurate with the polarity of that voltage. The greater the amount of the high frequency energy supplied to the ring, the lower is the effective resistance between the two electrodes. The response time, in the effective lowering or raising of the resistance between points 18 and 19 by this high frequency method, is of the order of one microsecond or less.

Figure 28:
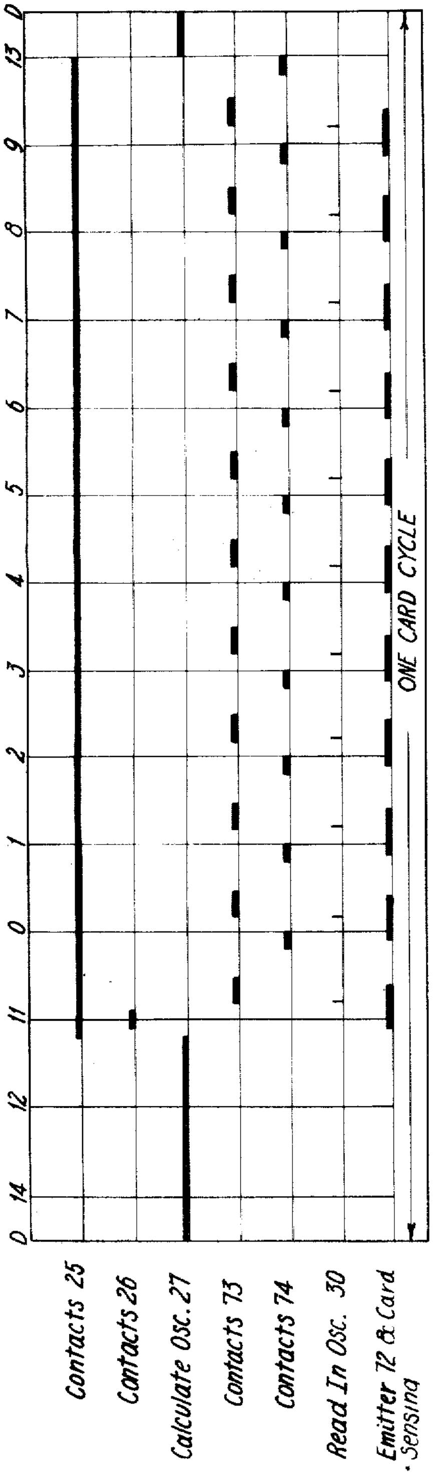
Fig. 28 is a timing chart illustrating the time sequence of various operations of certain elements during a card cycle.

The timing diagram, shown in Fig. 28, indicates the relative timing of several devices used in the control unit. The cycle shown is that of a card cycle of the calculator of the Palmer et al. application, Serial No. 38,078, mentioned above, and has a cycle of fourteen cycle points.

Figure 29:
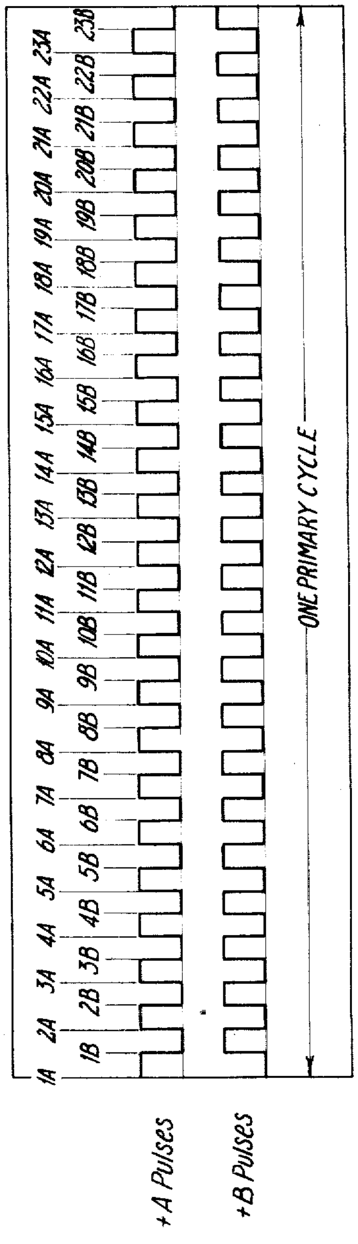
Fig. 29 is a timing chart on a different time scale than Fig. 28 of the primary cycle of the calculator.

Fig. 29, on an entirely different scale, is a diagram of the primary electronic cycle of the calculator, composed of A and B electronically produced pulses. The length of each A and B pulse is approximately 10 microseconds.

For a basic diagram showing two columns of storage, reference may be had to Fig. 27. Eight read-out lines are represented which with eight columns of storage similar to the two shown, provide means for storing an eight digit numeral.

The units column, as shown, has 10 condensers, the one labeled S being for Sign storage and the other nine condensers labeled 1 through 9, respectively, having correspondingly weighted or coded values of 1 through 9. All other columns (the tens for example) are similar except for the lack of the Sign storage condenser.

The trigger circuits (**23*a*, 23*b*, etc.) are normally conducting on the right side, arbitrarily called the reset position. In this state, the right grid G2 (pin 3) is at the potential of ground and the right plate (pin 7) is at +50 volts. If information is to be entered from the card 35 into condenser storage, the entry gas diode switches 20*a*, 20*b*, etc., must be ionized by the oscillator 29. The oscillator 29 is, as previously mentioned, of the self-latching type, wherein one source of potential is used to start oscillations and a second source of potential is used to sustain them. That type of operation makes it possible for the punched card and its reading brushes to control the read-in operation. A potential of +40 volts is applied, through cam contacts 25 (Fig. 27) during the read in cycle time 12.8 to 13 (see timing cycle Fig. 28) to the latching oscillator connection pin 5. A hole is punched, in a selected column, on the "X" row of the card if information is to be read in. As a sensing brush, say 31*a*, makes contact through the hole (approximately 12.9–11.45 of the card cycle—see card sensing timer, Fig. 28) a potential of +40 volts is applied to the energizing pin 4 of the oscillator 29. Once the oscillator 29 is energized, it stays energized, until the cam contacts 25** open, at 13 of the card cycle time (Fig. 28).

At the start of every read-in cycle, to insure that all condensers are discharged, an erasing operation is provided. Between 12.9 and 11.1 card cycle time, voltage is applied through the cam contacts 26, to turn on the oscillator 28. The oscillator 28 supplies high frequency energy to the gaseous discharge tube switches **21*a*, 21*b*, etc., to render them operative. A negative 100 volt supply is thereby applied through the operated switches 21 and entry switches 20 to pins 4 of the triggers 23*a*, 23*b*, etc. The triggers 23 are thus held by this negative 100 volts in a reset condition, which means that the potential of pin 3 is at approximately ground potential. During the time pin 3 is held at ground potential, control circuits, explained below, energize the oscillators #1 through #10 in sequence; each oscillator in turn, being energized for approximately ten microseconds with a ten microsecond interval between the time one is turned off and the next is turned on. The oscillators, in turn, as will be described below, prime or make responsive, the gaseous discharge tubes 17. As each gaseous discharge tube is made responsive, circuits are effectively made from the corresponding condensers to pins 3 of the triggers 23. As any pre-charged condenser is thusly connected to the triggers 23, they are discharged to the potential of pin 3, which is, under the described conditions, at ground. During this erase operation, each oscillator #1 through #10 is energized, in sequence, approximately 28 times. This insures the cancellation, before a read-in, of all existing storage. It should be noted at this point that if new information is not to be read in, the entry gaseous discharge tube switches 20 are not energized, the negative 100 volts is not applied to the left grids of the triggers 23** and the storage, already existing, is regenerated, as explained below, during the normal erase time.

Each time one of the trigger circuits 23 shifts from its reset to its "on" condition (left side conducting), the right plate pin 7 (see Fig. 27) goes positive. It is this positive signal that is used on read-out, which takes place during calculate time (to be explained). It should be noted here and kept in mind during the remainder of the description that the triggers 23 are reset, at the beginning of each regeneration and readout time as well as at the times any one of the oscillators 1 through 10 is deenergized.

Read-in to the condensers takes place as follows: At 11.2 card cycle time, the regeneration operations, to be explained later, are stopped, the read-in gaseous discharge tube switches 22*a*, 22*b*, etc., are ionized by the oscillator 30 in a manner to be described below for 600 microseconds and the oscillator 10 is operated as described below to ionize the Sign gaseous discharge tube switch 17*j*. If there is a punched hole in the card 35, indicating a negative number, a potential of plus 40 volts is applied to the trigger 23*a* via the sensing brush 31, the read-in gaseous discharge switch 22*a* and the entry gaseous discharge switch 20*a*. The trigger 23*a* of the units column is caused to shift by the application of this plus 40 volt potential, so that the left side conducts and causes pin 3 to go negative to approximately minus 28 volts. The minus 28 volts cause the gaseous discharge tube 17*j*, ionized by the oscillator 10, to fire and the Sign condenser is thereby charged to a negative 28 volts. If there is no hole in the card at the sign index point, a positive number is indicated. The trigger 23*a*, under this condition, remains in the reset condition and the Sign condenser S remains at ground potential. After four hundred microseconds, the oscillator 10 is turned off as described below and the high frequency is thereby removed from the Sign gaseous discharge tube switch 17*j*. Two hundred microseconds later or six hundred microseconds after it was first energized, the oscillator 30 is deenergized, as described presently, to remove the high frequency from the read-in gaseous discharge tube switches 22. The regeneration operation, described below, is again started and continues until 0.2 of the card cycle.

At 0.2 card cycle time, the read-in gaseous discharge tubes 22 are again energized by the oscillator 30 in a manner as will be described in detail below. In the illustrated embodiment of the invention there is no condenser provided for the zero position, since, if there is no storage in the other positions, it is an indication of a stored zero. However, should a more positive indication of the storage of a zero be desired, it is easily provided for, since, as will be explained below, regeneration is interrupted at zero reading time for 600 microseconds and means could be provided, such as a punched hole, to cause, at this time, the charging of a condenser which would have a weighted value of zero.

At 1.2 card cycle time, the oscillator 30 will again energize the read-in gaseous discharge tube switches 22. The #1 row of the card, at this time, is being sensed for punched holes. The oscillator #1 becomes energized and, in turn, energizes the gaseous discharge tubes 17*a* so that if 1's are punched in the card, the corresponding condensers #1 are charged in the same manner as described above for the Sign storage. The other read-in card cycle times are at 2.2 for reading 2's; 3.2 for reading 3's; etc. 9.2 for reading 9's.

Under control of circuits to be presently described, regeneration takes place at all times except during the erase time or the read-in times, described above. During regeneration, the oscillators #1 through #10 are activated to successively energize the gaseous discharge tube switches 17*a* through 17*j*. The timing is the same as that employed during the erase operation, i. e., each gaseous discharge tube switch is energized for ten microseconds with a ten microsecond interval, after one is turned off, before the next is turned on (made responsive). Regeneration is produced as follows:

Assume the trigger is reset, a particular gaseous discharge tube is made responsive and the condenser connected to it is charged to minus 28 volts, all as described above. The gaseous discharge tube is fired and the condenser discharges through the right grid (pin 3) circuit of the trigger, driving the right grid negative, thus tripping the trigger so that the right grid (G2) is driven to minus 28 volts. The gaseous discharge tube remains responsive and the just discharged condenser recharges to the potential of the right grid, i. e., to minus 28 volts.

Under the same assumed conditions, except that now the connected condenser is assumed to be at ground potential, the trigger would remain in a reset condition so that its right grid and the condenser would remain at ground potential. Further, if the condenser has a stray or residual charge, it discharges to ground potential. This stray or residual charge, of course, must not be of sufficient magnitude to trip the trigger.

Regeneration also takes place, after the 9.2 read-in time up to the 13.0 or calculate time of the card cycle. (See calculate oscillator 27 time Fig. 28.) At 13.0 of the card cycle, control circuits (to be explained) lock the energizing of the oscillators #1 through #10, in synchronism with the primary cycle of the calculator so that during this calculate time, the energizing of the oscillators #1 through #10 is synchronized, each time the primary timer of the calculator reaches time 8A (see Fig. 29) of its primary cycle, as long as the calculation is in progress, or until the limit of the calculate time, at 12.8 of the card cycle. When the calculate time is complete, regeneration is again started and continues until the next read-in time at 11.2 time of the card cycle.

The output terminals (pin 7) of the triggers 23 feed through gaseous discharge tubes 24*a*, 24*b*, etc., and switches 33 or 34 or inverters 32, to the bus lines 37 of the calculator. Assume a situation wherein the units order (trigger 23*a* and related devices) of storage contains a negative Sign and the digit 8, i. e., the Sign condenser and the #8 condenser are charged, to minus 28 volts, and the other condensers are at ground potential. As the program of the calculator 36 reaches a point wherein the information stored in the storage unit is called for, the calculator emits a positive signal to pin 5 of the transfer oscillator 27. The high frequency output from pin 7 is coupled to and energizes the gaseous discharge tubes 24*a*, 24*b*, etc. While the gaseous discharge tubes 24*a*, 24*b*, etc., are energized, any change in potential at the output pins 7 or the storage triggers 23*a*, 23*b* feeds through the said discharge tubes and also through either one of the inverters 32 (if the output is from other than the units order) or the switch circuits 33 and 34 (if a Sign or units order output). At the Sign read-out time, the oscillator #10 is energized and applies high frequency to the Sign gaseous discharge tube 17*j* and since there is a charge on the Sign condenser, the trigger 23*a* is shifted, making its right plate (pin 7) more positive. The charge on the Sign condenser is regenerated and further the positive output, now existing at pin 7, is fed through the gaseous discharge tube 24*a* to the switch circuits 33 and 34 at pins 6 and 9, respectively. The switch tube 33 remains inactive at this time as its other input (pin 9) is biased to keep the tube cut off. The switch circuit 34 receives a gating pulse at pin 6 from the calculator 36, simultaneously with the read-out of the Sign storage. As mentioned above, energizing of the oscillators #1 through #10 is synchronized each time the primary timer of the calculator reaches its 8A cycle point. Therefore, the gating pulse which is synchronous with the read-out of Sign storage is, as explained below, at the primary timer cycle point 9A. Since both grids of the switch circuit 34 receive positive pulses simultaneously, the switch conducts and a negative pulse occurs at pin 4. Pin 4 feeds to one of the bus lines 37 of the calculator, the particular line being the one for transmitting Sign indications.

Since the oscillators #1 through #10 are energized sequentially and in synchronism with the primary timer of the calculator, at 11A time the gaseous discharge tubes **17*i* are energized, which are connected to the condensers #9. The trigger circuits 23, which have been reset, remain in the reset condition since, under the example assumed, none of the condensers #9** is charged.

At 12A time, the gaseous discharge tubes **17*h* connected to the condensers #8 become energized. Since we have assumed storage of a digit 8, this condenser is charged and the units column trigger 23*a* is again shifted and a positive pulse appears at pin 7. This positive pulse is fed through the transfer gaseous discharge tube 24*a* to the switch circuits 33 and 34, but, at this time, the gating pulse from the calculator is supplied to pin 9 of switch 33. This gate pulse is supplied at pin 9 by the calculator from 10B to 20B primary cycle time; so that at 12A time both grids of the switch 33 are positive and a negative signal is produced at pin 4. Pin 4 is tied to the units column bus which leads into the calculator 36** and, more specifically, to a column shift unit of the calculator.

The outputs for each storage unit of the other columnar orders (tens through tens millions) are fed to inverter switches 32, at either pin 3 or 5. No Sign separation is necessary in these orders, therefore, no gating is necessary and the timed output signals are directly fed from pins 6 or 7 of these switches 32 into the calculator.

Figure 30:
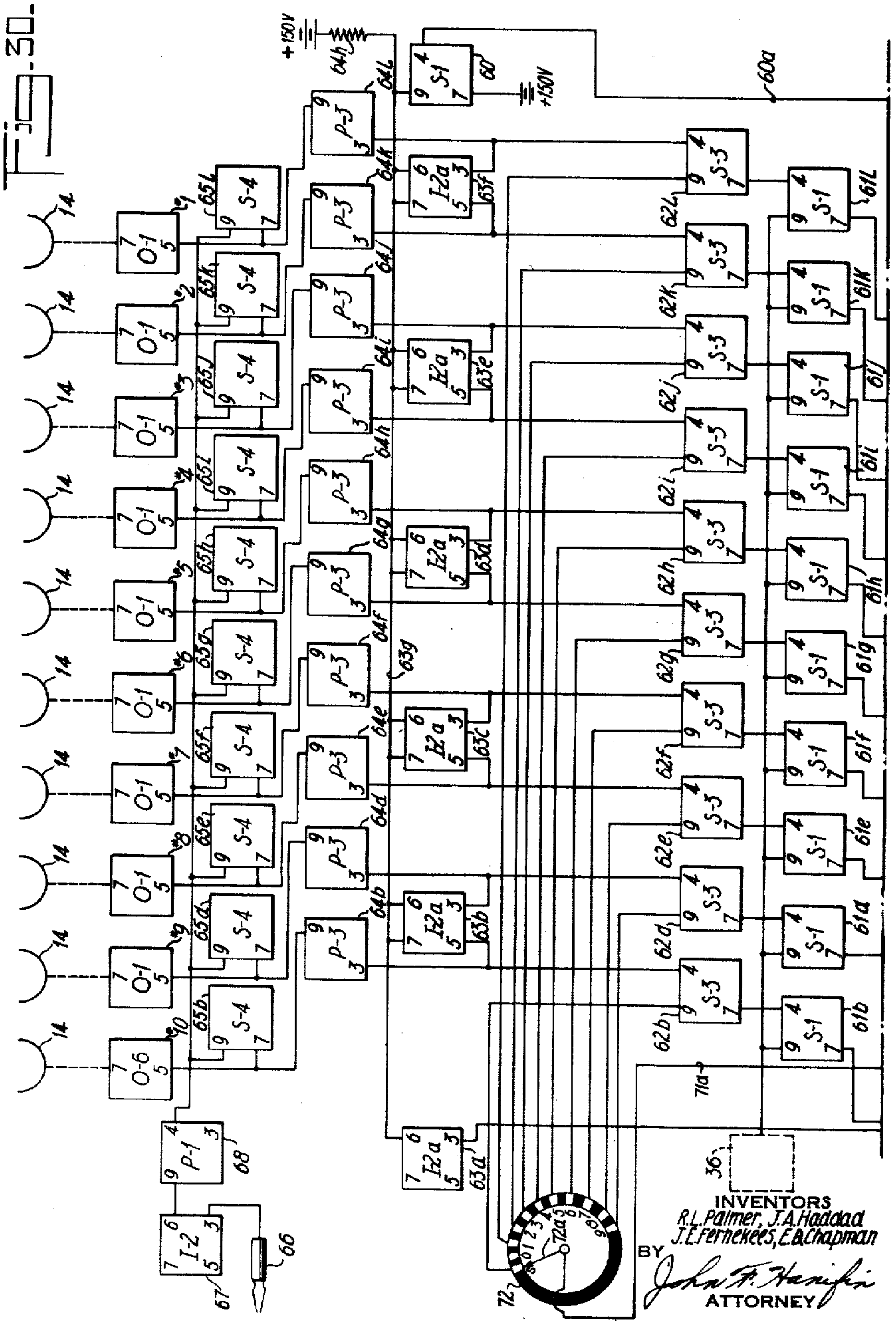

Refer now to Figs. 30 and 31 which, taken together, show the digit oscillators #1 through #10 and the control and interlock circuits therefor. When the storage unit is first turned on, a timing ring is reset, by well-known means (not shown), to effect a delay in applying the negative 100 volt bias to one side of the timing trigger circuits. This delayed application of voltage is to the 200K ohm resistor leading into the right grids G2 in all the ring triggers, except trigger **41*b*, where the delayed voltage application is to the 200K resistor leading to the left grid G1. Thus, trigger 41*b* is reset "on" while the other triggers of the ring are reset "off." The ring triggers are operated in sequence until all triggers are flipped off. As described below, at the end of read-in time, for example, the trigger 41*a* is reset "on." The timing ring (Fig. 31) consists of triggers 41*a* to 41*m* and is provided to supply signals to energize, as explained below, the oscillators #1 through #10 during regeneration and calculate time. The operation of the ring is as follows: An initiating pulse is applied to the first stage trigger 41*a* at pin 3 causing it to shift to an "on" condition ("on" when the left side is conducting; off when the right side is conducting). "B" pulses (see Fig. 29) from the calculator 36 are applied through the power circuit 50 to pin 6 of all triggers and a B pulse received by any trigger, which is "on," turns it "off." The turning off of trigger 41*a* causes the tapped plate at pin 8 to supply a negative pulse to pin 3 of the adjacent trigger 41*b*. Inasmuch as a "B" pulse and the negative pulse from the preceding stage arrive at the same time, the trigger 41*b* is shifted to an "on" condition. The next B pulse turns 41*b* off and, therefore, the next stage 41*c* goes on. The ring is stepped by B pulses until the last stage trigger 41*m* is turned off. The ring is then in a state wherein all stages are off and awaits the next initiating pulse at trigger 41*a* pin 3, which may or may not occur, as explained below, as trigger 41*m* is turned off. The triggers have the following purposes: 41*a* is the start trigger, 41*b* is the Sign trigger, 41*c* is a space trigger (needed for the calculator timing), 41*d* is the #9 digit trigger, 41*e* is the #8 digit trigger, etc., and 41L is the #1 digit and ring end test trigger, while 41*m*** is the last stage and regeneration start trigger.

Assume that the machine is in regeneration time and that the ring has been stepped, as explained above, to turn off trigger **41*m*. The output from trigger 41*m*, pin 7, now positive, is applied to the switch circuit 42, pin 7 (condenser coupling). The inverter 43 is cut-off, as explained below, when the machine is not in read-in or calculate time. The normally positive output from inverter 43, pin 6, conditions the switch 42, pin 9. Therefore, as the positive output signal from trigger 41*m*, pin 7, is applied to switch 42, pin 7 (condenser coupling differentiates the signal), a negative pulse is emitted from pin 4. This negative pulse is fed through the inverter circuit 44 (pins 3—6), the inverter circuit 45 (pins 5—7), the inverter 46 (pins 5—7), the inverter 47 (pins 5—7) to pin 3 of the trigger 41*a*. The pulse input to pin 3 is negative and turns the trigger 41*a* "on," therefore, causing the ring to start another cycle. The ring remains in regeneration operation until read-in or calculate time. It is to be noted that in timed relationship it is the output from the trigger 41*m*** which restarts the ring although the signal passes through several circuits.

The circuits from the ring to the oscillators #1 through #10 is identical for each position; hence the following description will be for one position only, namely, the "8" stage. The output of trigger **41*e* of the ring, when "on," is positive at pin 7 and conditions (Fig. 30) the switch 61*e*, pin 7. Pins 9 of the switches 61*b* through 61L receive "A" pulses (see Fig. 29) from the calculator 36. Therefore, when the trigger 41*e* of the ring is turned on by a B pulse, say 11B, to thus condition switch 61*e*, the next A pulse (12A) passes through this switch. (The 12B pulse turns off the trigger 41*e*.) The 12A pulse output from switch 61*e*, pin 4, is applied to pin 7 of a normally conducting switch cirrcuit 62*e*. The latter is so designed that when either input (pin 7 or 9) goes negative, the tube is cut off and the output at pin 4** goes positive.

The positive pulse output from **62*e*, pin 4, is fed to the inverter 63*c*, pin 5, and to the power circuit 64*e*, pin 3. The inverter 63*c* is part of a reset circuit, which will be explained later. The power circuit 64*e* is a cathode follower, the output from pin 9 feeding to an indicator switch circuit 65*e*, pin 7, and also to the oscillator #8. The oscillator #8 is thus energized (12A time) and supplies the high frequency energy, as explained above, to the gaseous discharge tubes 17*h* (Fig. 27). The indicator circuit switch which includes the switch 65*e*** will be explained below.

During the read-in times, it is necessary to block the signal which restarts the ring and to generate 400 to 600 microsecond pulses to energize, as described above, the gaseous discharge tubes.

During each index point 11 through 9 (see Fig. 28) the contacts 73 (lower right Fig. 31) close from .2 to .5 time and contacts 74 close from .8 time to .0 time of the next index point. For example, at 11.2 a positive potential is applied, through contacts 73 to pin 6 of the trigger 75, causing the trigger to shift to an "on" condition. The output pin 8 of trigger 75 goes negative and feeds trigger 76, pin 3, turning it "on." Pin 8 of trigger 76 goes negative and "conditions" pin 5 of the normally conducting inverter switch circuit 78. (The tube in the latter circuit is cut off only when both inputs are negative.) The second input of the inverter 78, pin 3, is condenser coupled (see Fig. 9).

The ring in the meantime is stepped by "B" pulses, through whatever cycle it is in, until the trigger 41L is turned on, following the above described conditioning of the inverter 78. As the trigger 41L goes on, its output pin 7 goes positive and feeds via the inverter 77 to pin 3 of the inverter 89 (to be explained later) and also to pin 3, of the now conditioned inverter 78. Both inputs of the inverter 78 now being negative, the tube is cut off and a positive pulse is available at the output pin 7.

This positive pulse is fed via the inverter 79 to turn on the trigger 80. Pin 7 of the trigger 80 is now positive and feeds via the inverter 43 (if either input to the inverter 43 is positive, the output is negative) to pin 9 of the switch 42. The signal applied to the switch 42, pin 9, is negative, therefore conduction in the tube is prevented. Therefore, as the ring is stepped and trigger 41*m* is turned on, the output from trigger 41*m*, pin 7, which ordinarily feeds through the switch 42 and the inverters 44, 45, 46 and 47 to restart the ring, is blocked at the switch 42.

The now positive output from trigger 80, pin 7, also conditions one input (pin 9) of the switch 81. The now negative output from trigger 80, pin 8, feeding to pin 3 of the inverter 45 has no effect at this time but is used later, as explained below, to restart the ring.

As the last stage of the ring (trigger 41*m*) is shifted to an "off" condition, the positive output voltage developed at pin 7 is also applied to the switch 81, pin 7. The switch 81 is now conditioned by the output of trigger 80, pin 7, and a negative pulse output is developed at pin 4. This pulse feeds to and trips the single shot multivibrator 82. This multivibrator ($RX=1.8K$ ohms) has a period of 600 microseconds, the negative pulse output developed at pin 7 feeding to the power circuit 83, pin 9.

The output of power circuit 83, pin 3, is positive and feeds both the cathode follower power circuit 87, pin 3, and an inverter circuit 85, pin 5. The output at power circuit 87, pin 9, energizes (for 600 microseconds) the read-in oscillator 30, thus supplying the high frequency energy to the read-in gaseous discharge tube switches 22 (see Fig. 27) as referred to generally above. The inverter 85 emits a 600 microsecond negative pulse which trips the 400 microsecond single shot multivibrator 86 at pin 3 ($RX=1.2K$ ohms), the output of the latter at pin 6 being a 400 microsecond positive pulse. The 400 microsecond pulse is fed through a power circuit 71 and via line 71*a* (Fig. 31 to Fig. 30) to a digit emitter 72. The digit emitter 72 has a rotating brush which rotates in synchronism with the card feed so that the brush 72*a* makes contact with the commutator points S and 1 through 9, as the corresponding rows of the card 35 (Fig. 27) are sensed (the sign indication being in the X row). At 11.2 time, the brush 72*a* makes contact through the commutator point S to the switch 62*b*, pin 9. It is to be recalled that whenever either input to the switch 62*b* is positive, its output pin 4 is negative.

Therefore, at 11.2 time, the 400 microsecond pulse passes through the emitter 72, the switch 62*b* and the power circuit 64*b* to energize the oscillator #10. (The oscillators #1 through #9 are energized by similar circuits during the corresponding card cycle times 1.2 through 9.2.)

The oscillator #10 remains energized for 400 microseconds and 200 microseconds after it is deenergized, the multivibrator 82 (Fig. 31) (natural period of 600 microseconds) returns to its quiescent state. The now positive output of the multivibrator 82, pin 7, feeds to the power circuit 83 causing the output pins 3 and 4 of the latter to go negative. The output from pin 3 feeds through the cathode follower power circuit 87 to deenergize the oscillator 30 (deenergizes the gaseous discharge tubes 22, Fig. 27).

The now negative output from the power circuit 83, pin 4, feeds to the trigger 80, pin 6, and the trigger 76, pin 6, resetting both triggers to an "off" condition. The output of trigger 76, pin 8, now positive, feeds to pin 5 and disables the inverter 78. Since both inputs of the inverter 78 must be negative to obtain a positive output, signals thereafter generated by the ring at trigger 41L, pin 7, feeding through the inverter 77, to pin 3 of the inverter 78, are blocked at that point (until the next read-in time) and, therefore, do not start the read-in operation just described.

The output of trigger 80, pin 7, now negative, causes further disability of the read-in control circuits by keeping the switch 81 in a cut-off condition. Therefore, signals hereafter emitted by the trigger 41*m* do not pass (until the next read-in) through the switch 31 to trip the multivibrators 82 and 86.

The negative output of trigger 80, pin 7, feeding the inverter 43, pin 3, also conditions the regeneration control circuit. (Pin 5 of the inverter 43 is negative except during calculate time as explained below.) The output of the inverter 43, now positive, feeds to pin 9 of the switch 42 which permits passage, as explained above, of the output trigger 41*m*, at the end of a regeneration cycle, to restart the ring.

Although the output of the trigger 41*m*, pin 7, is a sustained positive output at the end of a read-in, it does not start a regeneration cycle due to the fact that pin 7 of the switch 42 is a condenser coupled input and will thus pass only a positive change in signal. Therefore, even though the input pin 9 of the switch 42 becomes conditioned at the end of read-in time, switch 42 does not pass the output of trigger 41*m*, the latter at that time being a non-changing positive output.

The output of switch 42 therefore remains positive and is fed via the inverter 44 to effectively apply a negative signal at pin 5 of the inverter 45. The inverter 45, being the I–3 type, is now (at end of read-in time) under control of the input at pin 3. As trigger 80 goes off (also at the end of read-in time), pin 8 goes positive and feeds to input pin 3 of the inverter 45. The latter input is a condenser coupled circuit; therefore, a negative pulse output is developed at pin 7 which passes through the inverters 46 and 47 to the trigger 41*a* to restart the ring. The machine thereby re-enters regeneration which continues until the read-in operation is repeated at 0.2 card cycle time. The read-in operation is also repeated at 1.2, 2.2, 3.2, 4.2, 5.2, 6.2, 7.2, 8.2, and 9.2 of the card cycle with regeneration occurring between read-ins.

The calculation time starts at 13.0 time of the card cycle. At that time, the unit should be in a regeneration cycle so that regeneration must be stopped and the ring placed under control of the primary timer of the calculator. At 13.0 of the card cycle, the start of calculate time, a negative pulse is emitted from the calculator 36 to the trigger 88, pin 3 (lower left Fig. 31). The trigger 88 is turned on so that the output at pin 8 becomes negative and thereby conditions the normally conducting inverter 89, pin 5.

At 13.0 card cycle time, the ring is in a regeneration cycle and may be at any particular stage of the ring. The ring is stepped, one or more stages, to the stage wherein the trigger 41L is turned on. The output from trigger 41L, pin 7, now positive, feeds through the inverter 77 to the inverter 78 and also to the inverter 89. The input to the inverter 78, as previously explained, has no effect since the trigger 76 is off. However, the negative input to the conditioned inverter 89, pin 3, is differentiated by the condenser coupled input to stop conduction of its tube to develop a positive output pulse at pin 7. This positive pulse is fed through the inverter 90 to pin 3 of the compute-start trigger 91. The trigger 91 is turned on and its output at pin 8, now negative, is fed through the inverter 92. The output of the inverter 92, pin 7, is positive and is fed to the calculator 36 and also to the inverter 43, pin 5. The signal to the calculator gates certain outputs of the primary timer of the calculatcr whereas the positive signal to the inverter 43, pin 5, causes conduction and a consequent negative output at pin 6. This negative signal disables the switch circuit 42, thereby preventing, as previously described, the continuation of regeneration cycles.

The calculator 36, now under control of the primary timer, emits a positive pulse at 8AB time (a pulse starting at 8 and ending at 9 primary cycle time) to pin 5 of the inverter 84, causing the output at pin 7 to go negative. From the inverter 84, pin 7, the signal is fed through inverters 46 and 47 to the ring start trigger 41*a*, pin 3. The input to the trigger 41*a* is condenser coupled so that the signal is differentiated to a sharp pulse and the trigger 41*a* is turned "on." Since it is started at "8" time of the primary cycle, the ring is in synchronization with the primary timer. The ring is stepped, by B pulses, the first being an 8B pulse, until the last stage trigger 41*m* is turned off by the 20B pulse. All the triggers remain off until the next 8AB signal emitted by the calculator turn on the trigger 41*a*, to restart the ring.

The calculator 36 also emits a reset signal to the trigger 88 (Fig. 31), pin 6, during the first calculate cycle, that is sometime between 8B and 20B of the first read-out. This reset pulse is necessary to remove the negative input to pin 3 of the trigger 91 from trigger 88 via inverters 89 and 90 because the calculation may require but one read-out. The trigger 91 is reset "off" by a pulse to pin 6 from the calculator 36 at 1B time of the primary cycle, following the end of the calculation or the end of calculate time at 12.8 of the card cycle. Since the trigger 88 is turned "off" during the first read-out cycle, the trigger 91 on being turned "off," anytime thereafter remains "off."

As the trigger 91 is shifted "off", the output of the inverter circuit 92, pin 7, goes negative and deenergizes the primary timer of the calculator 36. More specifically, it prevents the primary timer of the calculator from advancing beyond the "1" or home position of the timer, following the cycle that is in progress. The output from inverter circuit 92, pin 7, is also fed through inverter circuit 43 to recondition switch circuit 42, pin 9, so that as the device goes back into regeneration time, it may proceed as described above.

At the same instant, that is 1B time after the last read-out cycle, the output pin 6 of the inverter circuit 92 goes positive and feeds to the inverter circuit 84. The pulse is fed through the inverter circuits 46 and 47 to turn on the ring start trigger 41*a*. B pulses are continually fed to the timing ring so regeneration again starts and continues as described above.

Switches 65*b* (Fig. 30) and 65*d* through 65L provide a means of visually checking the information stored in one column. Refer to the switch 54 (Fig. 14) and note that whenever both inputs are positive, the tube conducts and the neon tube N glows.

The probe 66 (Fig. 30) may be held on the output terminal pin 7 of one of the storage triggers, say trigger 23*a* (Fig. 27). Any signal developed at that terminal is applied to the inverter 67, pin 3. If the output pin 7 of the trigger 23*a* goes positive, it is an indication that a charge is being placed on a condenser or that a charge on a condenser has tripped the trigger in a regeneration or read-out operation, as described above. The output of the inverter 67, pin 6, is then negative and is fed through the power circuit 68 to the input pins 9 of the switch circuits 65*b* and 65*d* through 65L. The output of the trigger is positive synchronously with the energizing, in turn, of the high frequency oscillators #1 through #10. Therefore, as the oscillator #8 is energized, which may be at 8.2 read-in time of the card cycle, at 12A time of the primary cycle or at the times that trigger 41*e* is energized during regeneration cycles, then whenever the neon tube in the switch 65*e* glows, it is an indication that the #8 condenser is charged. The switch 65*b* is the indicator for Sign storage (neon tube glows to indicate a negative sign); 65*d* for the #9 condenser, 65*e* for the #8 condenser, etc, and 65L for the #1 condenser.

The reset signal for the storage triggers 23*a*, 23*b*, etc., is developed each time the ring is started as well as at the conclusion of the energization of any one of the oscillators #1 through #10. The signals are developed as follows. Refer to the inverter circuits 63*a* through 63*f* (Fig. 30). These inverters I–2*a* differ from the I–2 type in that there are no individual plate resistors or plate power supplies. The plates of these inverters are connected through common plate resistor 64*h* to the +150 volt power supply. If a positive signal is applied to either input pins 3 or 5 of any one of these inverters, the common output goes negative.

The signals which are emitted from the switch circuits 62*b* through 62L to power circuits to energize the oscillators #1 through #10, also feed to the inverter circuits 63*b* through 63*f*. For example, the output of the switch 62*e*, pin 4, feeds through the power circuit 64*e* to energize the oscillator #8. The output of switch 62*e*, pin 4, also feeds to the inverter 63*c*, pin 5. Therefore, as the oscillator #8 is energized, the common output line 63*g* goes negative.

The line 63*g* is also negative each time the ring is started, as the output of trigger 41*a*, pin 7 (Fig. 31), positive when the trigger is on, is fed to the inverter 63*a* (Fig. 30) pin 3.

The common output line 63*g* feeds to the switch 60, pin 9. The switch 60 is always conditioned by the positive 150 volt input to pin 7. During the times that the line 63*g* is negative, the switch 60 is cut off and its output pin is positive.

As the trigger 41*a* goes off, or at the conclusion of the energization of one of the oscillators #1 through #10, the line 63*g* returns to a positive potential. It is this positive excursion which is used, through circuits now to be traced, to reset the triggers 23*a*, 23*b*, etc. This positive excursion of the signal on line 63*g* is inverted by the switch 60, the negative output appearing at pin 4. This signal is then inverted several times to introduce a slight time delay. The purpose of this delay is to insure that the gaseous discharge tubes which connect condensers to the triggers have time to deionize before the triggers are reset. The circuit may be traced from the switch 60, pin 4, line 60*a* (Fig. 30 to Fig. 31), the left side of inverter 69 (pin 5 to 7), the right side of inverter 69 (pin 3 to pin 6), inverter 70 (pin 3—6) and the power circuit 71. The output of the power circuit 71 goes negative as the signal on line 63*g* goes positive to thus reset the triggers 23, 23*a*, 23*b*, etc. It is the negative output of the power circuit 71 which feeds to and resets the triggers 23 (see Fig. 27). This insures that the triggers 23 are reset provided any of them had been turned on by read-in, read-out or regeneration signals.

Thus, the invention described provides a plurality of condensers capable of storing charges to represent characters. Fast acting gaseous discharge tubes are controlled by sources of high frequency to connect the condensers to bistable trigger circuits. The trigger circuits in an "on" condition of stability emit signals through the gaseous discharge tubes to charge the condensers. When the trigger is in a "reset" condition of stability, the condensers go to ground potential. Three basic operations are provided, i. e., read-in, read-out and regeneration. During read-in, the trigger circuits may be conditioned by any pulse emitting means, for example, by sensing of a punched card, while the sources of high frequency actuate the gaseous discharge tubes. During regeneration and read-out, the trigger circuit is conditioned by condensers discharging through one of the grid circuits as the gaseous discharge tubes are actuated to shift the trigger from a "reset" to an "on" condition, the trigger emitting an output signal and also a signal to recharge the condensers.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A storage device comprising a plurality of condensers, means selectively charging said condensers to represent a value, said means including a trigger circuit and a plurality of high frequency controlled switches, each switch being connected to said trigger and to a different one of said condensers, a plurality of oscillators serving as a source of high frequency, means coupling the outputs of said oscillators to the high frequency controlled switches and means actuating the oscillators sequentially thereby connecting each of said condensers to said trigger.

2. A storage device comprising a plurality of condensers, certain ones of said condensers being precharged, the combinational charged-uncharged pattern of the condensers representing a value, a bistable trigger circuit, a plurality of high frequency controlled switches, each one of said switches connected to said trigger and to a different one of said condensers, high frequency means actuating said switches in sequence thereby connecting each condenser to said trigger, said precharged condensers upon being connected discharging through said trigger, said trigger thereby shifting from one condition of stability to another and emitting a voltage pulse, said voltage pulse being transmitted through the then actuated switches to restore the charges on the precharged condensers.

3. A storage device comprising a plurality of condensers, certain ones of said condensers being precharged, the combinational charged-uncharged pattern of the condensers representing a value, means to erase said charges, said means including a bistable trigger circuit, means clamping said trigger in one condition of stability, a plurality of high frequency controlled switches, each one of said switches connected to said trigger and to a different one of said condensers, high frequency means actuating said switches in sequence thereby connecting each condenser to said trigger, said precharged condensers thereby discharging through said trigger.

4. A storage device for storing characters represented by time coded pulses including a plurality of condensers, said condensers being charged in selective permutations in accordance with one coded character to be stored, discharge tubes, each discharge tube connected to a different one of said condensers, a trigger circuit connected to said discharge tubes, the trigger circuit arranged to be tripped by the time coded pulses and thereby emit signals to the discharge tubes, high frequency means rendering the discharge tubes synchronously responsive, in the time code, whereby the discharge tubes are fired by the emitted signals, said condensers connected thereto being thereby charged in a permutation in accordance with the particular coded character being received.

5. A storage device for storing characters represented by time coded pulses including condensers arranged in a row, said row being responsive to one coded character to be stored, a trigger circuit having an output terminal, discharge tubes, each connected to a different one of said condensers and to said trigger circuit such that on being tripped, said trigger circuit emits signals to said discharge tubes, high frequency means priming the discharge tubes sequentially and synchronously in the time code; a read in to storage being effected, by the time coded pulses tripping said trigger whereby said trigger thereby emits signals in consonance with said time coded pulses to selectively fire the discharge tubes and charge the condensers in accordance with the particular character being received; read-out and regeneration of the charged condensers being effected by the charged condensers discharging through and firing the discharge tubes, as the latter are sequentially and synchronously primed in the time code, to thereby trip the trigger circuit, the trigger circuit emitting an output signal and also a signal through the discharge tube to recharge the condenser.

6. A storage device for storing characters represented by time coded pulses including a bank of condensers, said bank being responsive to one coded character to be stored, and said bank including a row of individual condensers, gaseous discharge tubes each connected to a different one of said condensers, a trigger circuit connected to said gaseous discharge tubes and arranged, on being tripped, to emit pulses to the gaseous discharge tubes, high frequency means, means rendering said high frequency means operative in synchronism with the elements of said time code for sequentially rendering the gaseous discharge tubes responsive to the emitted pulses, means feeding the separate time coded pulses to the trigger to flip said trigger to thereby emit pulses to fire the gaseous discharge tubes whereby the condensers connected thereto are selectively charged in accordance with the character being received.

7. A storage device for storing characters represented by time coded pulses including condensers arranged in a row, said condensers having a charge-uncharged pattern representing a character in accordance with the code, gaseous discharge tubes, each connected to a different one of said condensers, a trigger circuit connected to said gaseous discharge tubes, high frequency means coupled to said gas tubes rendering the gas tubes responsive sequentially and synchronously in the time code, whereby the charged condensers, as the gas tubes connected to them become responsive, discharge through and trip the trigger circuit, the trigger circuit thereby emitting an output signal and a signal through the gas tube to recharge the condenser.

8. A storage device for storing characters represented by time coded pulses including a plurality of condensers, a trigger circuit arranged to receive and to be tripped by said pulses, gaseous discharge tubes each having a conductive coating thereon, each of said tubes connected to said trigger and to a different one of said condensers, high frequency oscillators each coupled to a different one of said conductive coatings, means energizing said oscillators, sequentially and synchronously in the time code, such that the respective gas tubes are made responsive, the trigger circuit on being tripped by said time coded pulses emitting a signal to fire the discharge tubes and charge the condensers connected thereto in accordance with the coded character being received.

9. A storage device for storing characters represented by time coded pulses including a plurality of condensers capable of having a charged-uncharged pattern representative of storage of a certain character, a trigger circuit, a plurality of gaseous discharge tubes, each connected to said trigger circuit and to a different one of said condensers such that by simultaneously tripping said trigger and energizing one of said discharge tubes, the trigger emits a signal through the energized gas tube to charge the condenser connected thereto, high frequency means energizing the gas tubes, sequentially and synchronously in the time code, means producing time coded pulses, said pulses being fed to trip the trigger, the trigger thereby emitting signals through said gas tubes to charge the condensers, in accordance with the coded character being emitted by the producing means.

10. A storage device as in claim 9 and including means for resetting the trigger, as each gaseous discharge device is deenergized.

11. A storage device comprising a bistable trigger reset to an "off" condition, said trigger emitting a signal of a first potential when the trigger is "on" and a second potential when the trigger is "off," a gaseous discharge tube in series connection between said trigger and a condenser, said condenser being precharged to said first potential, high frequency means ionizing said discharge tube whereby current flows through the discharge tube to said trigger to thereby discharge said condenser and to thus shift the trigger from its "off" to its "on" condition, said trigger thereupon emitting a signal at the first potential which is transmitted through said ionized gaseous discharge tube to said condenser, to restore it to its precharged condition.

12. A storage device comprising a bistable trigger reset to an "off" condition, said trigger having a terminal emitting a signal of a first potential when the trigger is "on" and a signal of a second potential when the trigger is "off," a gaseous discharge tube in series connection between said terminal and a condenser, high frequency means periodically ionizing said discharge tube, read-in means operative in synchronism with said high frequency means for shifting said trigger to an "on" condition whereby current flows through said ionized discharge tube to charge said condenser to said first potential, means resetting said trigger to an "off" condition subsequent to said ionization of said discharge tube, said condenser discharging through said discharge tube and said trigger, on subsequent ionizing of the gaseous discharge tube, to shift said trigger to an "on" condition, said trigger thereupon emitting a signal of said first potential which is fed through said gaseous discharge tube to recharge said condenser.

13. A storage device as claimed in claim 12, and including output means connected to said trigger.

14. A machine for handling records including means for reading a storage record consisting of columns and rows for representing information designations, a plurality of condensers, means controlled by reading means selectively charging said condensers according to the designations read, electronic means regenerating the charges on said condensers intermediate the reading of designating rows, said charges being regenerated at a rate independent of the time required for reading said storage record.

15. A machine for reading information representing designations on record cards and storing information read comprising, in combination, means for sensing designations on said record cards, a plurality of condensers, means selectively charging said condensers upon the sensing of designations, said means including a bistable trigger circuit, said sensing means emitting signals to said trigger upon sensing a designation, said trigger shifting from one condition of stability to another condition of stability upon reception of said signals, a plurality of switches, adapted to be actuated when subjected to high frequency, each switch being connected to said trigger and to a different one of said condensers such that on the actuation of a switch and the shifting of a trigger a signal is emitted from said trigger through the actuated switch to charge the condenser connected thereto, a plurality of oscillators acting as sources of high frequency, means coupling the outputs of the oscillators to said switches, and means, operating synchronously with said sensing means, for energizing said oscillators in sequence to actuate said switches.

16. A machine for reading information representing designations on record cards and storing information read comprising, in combination, means for sensing designations on said record cards, a plurality of condensers, means selectively charging said condensers upon the sensing of designations, said means including a bistable trigger circuit adapted to shift from one condition of stability to another and emit a voltage pulse on reception of a signal, means connecting said sensing means and said trigger such that the trigger receives signals from the sensing means as designations are sensed, a plurality of switches adapted to be actuated when subjected to high frequency, each one of said switches being connected to said trigger and to a different one of said condensers, high frequency means, operating synchronously with the sensing means, actuating the said switches in a predetermined sequence to connect the condensers to the trigger whereby the voltage pulses emitted by the trigger as designations are sensed pass through the switches to charge the condensers.

References Cited in the file of this patent

UNITED STATES PATENTS

| | | |
|---|---|---|
| 2,208,655 | Wright | July 23, 1940 |
| 2,514,054 | Hallden | July 4, 1950 |
| 2,518,405 | Van Duuren | Aug. 8, 1950 |
| 2,582,480 | Dimond | Jan. 15, 1952 |
| 2,607,893 | Cooper et al. | Aug. 19, 1952 |
| 2,612,547 | Johnston et al. | Sept. 30, 1952 |
| 2,630,550 | Geohegan | Mar. 3, 1953 |
| 2,695,396 | Anderson | Nov. 23, 1954 |

FOREIGN PATENTS

Publication, "The Diode-Capacitor Memory," November 1953, A. W. Holt, Nat. Bur. Standards, Report #2940 (pp. 1–3 and Fig. 1). (Copy in Div. 23, 236–61 MS.)